US008918422B2

(12) United States Patent
Stelman et al.

(10) Patent No.: US 8,918,422 B2
(45) Date of Patent: Dec. 23, 2014

(54) METHOD AND SYSTEM FOR USING EMAIL DOMAINS TO IMPROVE QUALITY OF NAME AND POSTAL ADDRESS MATCHING

(75) Inventors: Vadim L Stelman, Trumbull, CT (US); Alla Tsipenyuk, Woodbridge, CT (US)

(73) Assignee: Pitney Bowes Inc., Stamford, CT (US)

( * ) Notice: Subject to any disclaimer, the term of this patent is extended or adjusted under 35 U.S.C. 154(b) by 8 days.

(21) Appl. No.: 13/603,740

(22) Filed: Sep. 5, 2012

(65) Prior Publication Data

US 2014/0067756 A1 Mar. 6, 2014

(51) Int. Cl.
  *G06F 17/30* (2006.01)
  *G06Q 10/10* (2012.01)
(52) U.S. Cl.
  CPC ........ *G06Q 10/107* (2013.01); *G06F 17/30539* (2013.01)
  USPC .......................................................... 707/776
(58) Field of Classification Search
  CPC .................... G06F 17/30539; G06Q 10/107
  USPC ........................................................ 707/776
  See application file for complete search history.

(56) References Cited

U.S. PATENT DOCUMENTS

| 6,466,940 | B1 * | 10/2002 | Mills .................................... 1/1 |
| 6,839,738 | B2 | 1/2005 | Quine |
| 6,895,427 | B2 | 5/2005 | Quine |
| 6,901,436 | B1 * | 5/2005 | Schneider ..................... 709/219 |
| 7,149,780 | B2 | 12/2006 | Quine |
| 7,543,026 | B2 | 6/2009 | Quine |
| 2003/0046103 | A1 * | 3/2003 | Amato et al. ..................... 705/1 |
| 2006/0230039 | A1 * | 10/2006 | Shull et al. ......................... 707/6 |
| 2007/0046019 | A1 * | 3/2007 | Harrison, Jr. ................... 283/61 |
| 2009/0112994 | A1 * | 4/2009 | Vander Veen ................. 709/206 |
| 2013/0117287 | A1 * | 5/2013 | Jagota et al. .................. 707/755 |

OTHER PUBLICATIONS

Bramer, What contact information does BuzzStream find in Discovered Contact info, Jan. 2, 2012.*
Culotta, A., Bekkerman, R., & McCallum, A. (2004). Extracting social networks and contact information from email and the web.*
Gratt, 6 Power Tools for Content-Driven Link Development, Jul. 10, 2012.*

* cited by examiner

*Primary Examiner* — William Spieler
(74) *Attorney, Agent, or Firm* — Brian A. Lemm; Charles R. Malandra, Jr.; Steven J. Shapiro

(57) ABSTRACT

Improvement of the quality of name and address matching processes using e-mail domains is provided. A distinction is made between e-mail domains designed to be used by employees of an entity and domains designed to be used by individuals or organizations who aren't employees of the domain owner entity. By analyzing domain names in conjunction with known relationships between e-mail addresses and names of companies, it is possible to differentiate between employee-use domains and public-use domains and maintain a collection of employee-use domains that are associated with the domain owner's business name. When performing a name and address matching process, the e-mail domains of the input records can be checked against the collection of employee-use domains and the records for the input name and address can be supplemented to include the domain owner's name and address as alternative information.

7 Claims, 3 Drawing Sheets

METHOD AND SYSTEM FOR USING EMAIL DOMAINS TO IMPROVE QUALITY OF NAME AND POSTAL ADDRESS MATCHING

FIELD OF THE INVENTION

The invention disclosed herein relates generally to systems and methods for name and address matching, and more particularly to systems and methods that use e-mail domains to improve the quality of name and address matching.

BACKGROUND OF THE INVENTION

There are numerous instances when businesses or other entities need to accurately match a customer list against other types of lists, such as consolidation and cleansing of multiple lists that may have been generated by various different business functions. Consolidation, cleansing and removing duplicates in address lists is often required for a mailer to receive postal discounts. Additionally, as more businesses wish to compete for customers in the global marketplace, they will want to obtain new data about their customers to broaden their customer understanding, to use in data analysis, and to craft marketing campaigns. Such data is only useful when it is accurately matched to the right customers.

Traditional address matching applications use information such as a business name and physical address. A positive match is identified only if both of the business name and physical address are similar. If either one of these is not similar enough, existing applications will return a "no match" result. In recent years, e-mail addresses have also become available for use along with the physical address for matching, especially for records that may not include a business name. The use of e-mail addresses suffers from the same drawbacks as described above, in that current applications do not take full advantage of the information embedded in e-mail addresses and use it as-is along with other fields to do address and name matching. Thus, only an exact match on an e-mail address domain will return a positive match. This only partially improves matching accuracy and in some cases can actually cause more false positive matches. For example, in the situation of a multi-office building with multiple small businesses, these small businesses may not have their own registered email domains. They will often use Internet Service Provider (ISP), e.g., optonline.net, or E-mail Service Provider (ESP), e.g., yahoo.com, provided e-mail addresses and domains. Using these domains as an alternate matching field would create an unpredictable number of false positive matches, as all of the businesses at that physical location with the same domain will result in an erroneous match to each other.

SUMMARY OF THE INVENTION

The present invention provides a system and method that that use e-mail domains to improve the quality of name and address matching. The present invention makes a distinction between e-mail domains designed to be used by employees of an entity, e.g., business, organization, and the like, hereinafter referred to as employee-use domains, and domains designed to be used by individuals or organizations who aren't employees of the domain owner entity, such as e-mail or internet service providers, hereinafter referred to as public-use domains. By analyzing domain names in conjunction with known relationships between e-mail addresses and names of companies, it is possible to differentiate between employee-use domains and public-use domains and maintain collection of employee-use domains that are associated with the domain owner's business name. When performing a name and address matching process, the e-mail domains of the input records can be checked against the collection of employee-use domains and the records for the input name and address can be supplemented to include the domain owner's name and address as alternative information. This will improve the chances of a match with another record from the list that uses the alternative information, while not increasing the chances of a false-positive match.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate presently preferred embodiments of the invention, and together with the general description given above and the detailed description given below, by way of example serve to explain the invention in more detail. As shown throughout the drawings, like reference numerals designate like or corresponding parts.

DETAILED DESCRIPTION OF THE PRESENT INVENTION

Figure 1:
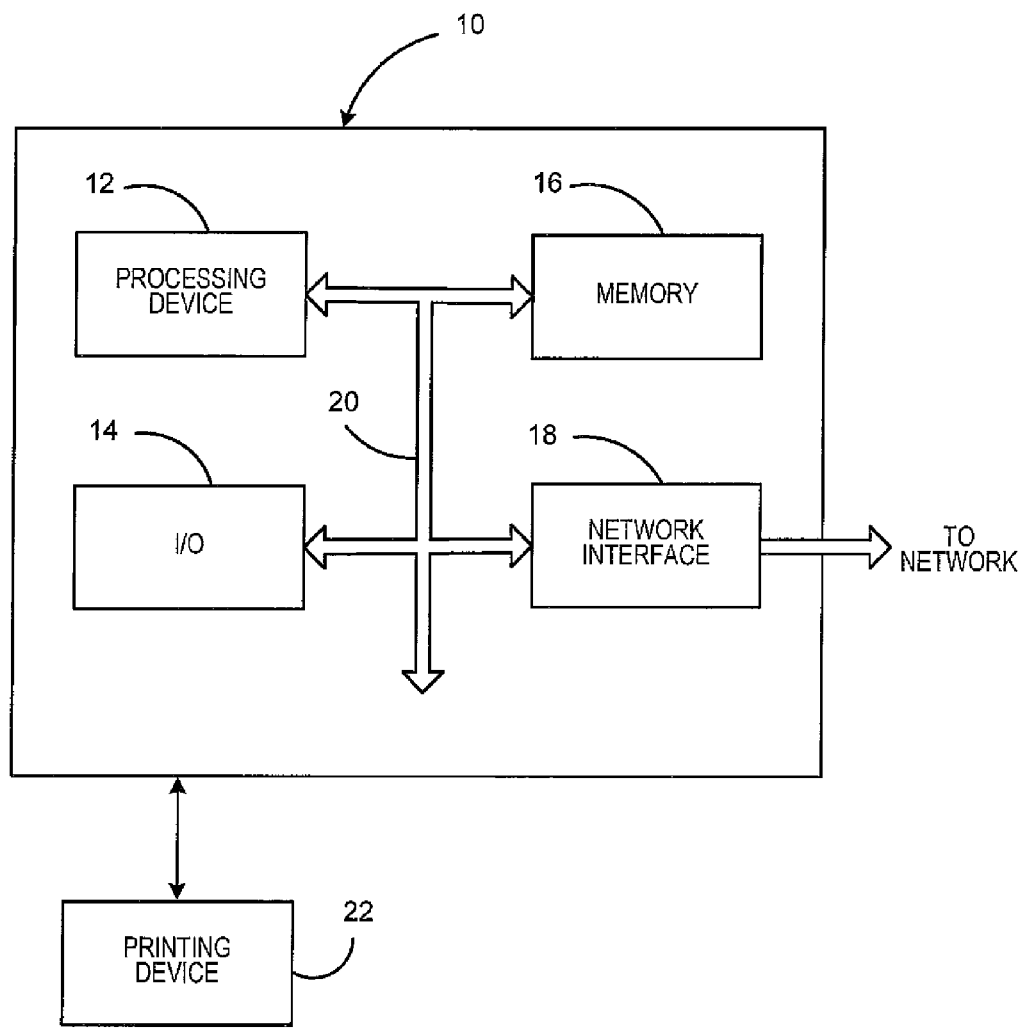
FIG. 1 illustrates in block diagram form a computer system that can be used to perform address matching to an embodiment of the present invention.

In describing the present invention, reference is made to the drawings, wherein there is seen in FIG. 1 in block diagram form a portion of a computer system 10 that can be used to perform address matching according to an embodiment of the present invention. Computer system 10 may be a personal computer, server, mainframe or the like that includes at least one processing device 12. Computer system 10 may be specially constructed for the required purposes, or it may comprise a general purpose computer selectively activated or reconfigured by a computer program (described further below) stored therein. Such a computer program may alternatively be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, which are executable by the processing device 12. System 10 can include one or more input/output devices 14, which can include, for example, a display, keyboard, disc drive, etc. The processing device 12 utilizes a memory device 16 for storing data and operating instructions. Memory device 16 can include one or more of the different types of memory described above. A network interface 18 is provided to allow the computer system 10 to communicate with other computer systems via a network, such as, for example, the Internet or a LAN. Each of the components of the computer system 10 communicate via a system bus 20. A printing device 22, such as a laser printer or ink jet printer, can be coupled to the computer system 10. One of ordinary skill in the art would be familiar with the general components of a computing system upon which the method of the present invention may be performed.

Figure 2:
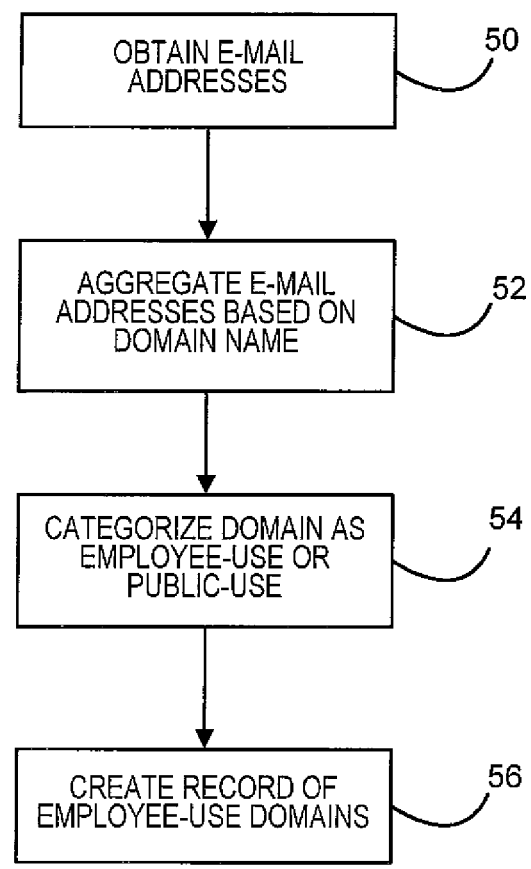
FIG. 2 illustrates in flow diagram form the classification of e-mail domains according to an embodiment of the present invention.

Referring now to FIG. 2, there is illustrated in flow diagram form the classification of e-mail domains according to an embodiment of the present invention. In step 50, one or more address lists that contain company names and e-mail addresses is obtained and entered into the computer system 10. Such lists could come from, for example, third party vendors that specialize in supplying such mailing lists to its customers, a company's own database of contacts, or by capturing publicly available information on the web. Computer system 10 stores each record separately in memory 16. In step 52, the e-mail domains of each record are extracted, using, for example, standard identification techniques to identify specific information as are known in the art, and the extracted e-mail domains are aggregated by domain. Also, a count is made of the number of e-mails found for each domain/company name combination. In step 54, the aggregation is analyzed by the processing device 12 to determine if a domain has a predominant company name associated therewith. If there are other companies associated with that domain, they can be considered as data errors inherited from the original data lists obtained in step 50. If a predominant company name is found, then that domain can be categorized as an employee-use domain with the predominant company name as the owner of the domain and the company name is attached to that domain name. If a predominant company name if not found, then the domain is categorized as a public-use domain and no company name is attached to it. In step 56, a record is created of all of the employee-use domains and their attached company names found in step 54.

As an example that illustrates the processing shown in FIG. 2, consider the example of five different e-mal domain registrants: BusinessName, MyESP, LocalSchool, SmallTown, and BusinessAssociation. BusinessName is the name of a business that owns the e-mail domain. For example, Pitney Bowes owns the domain name "pb.com." Only the employees of BusinessName are allowed to have e-mail addresses with that domain, and in general the vast majority of the employees use e-mail with that domain while conducting their business for BusinessName. MyESP is an e-mail service provider (ESP) organization that owns two different e-mail domains—"myesp.com" and "myesp.net." The former is reserved for e-mail addresses for employees of MyESP only, the latter is used for e-mail addresses for both individual and business customers of MyESP. LocalSchool is a school system that owns the e-mail domain "localschool.org" and uses it for its employees' business e-mail addresses. It may also have an agreement with a small number of local community organizations allowing them to use that domain for their e-mail addresses. SmallTown is a small town that owns the e-mail domain "smalltown.org" and uses it for its employees' business e-mail addresses. It may also have an agreement with local community organizations and businesses that allow them to use e-mail addresses with the same domain. BusinessAssociation is a business association that owns one e-mail domain "businessassociation.org" and uses it for its employees. It may also offer e-mail services for its member businesses using the same e-mail domain.

The process of analyzing the aggregation results to find a predominant company (step 54 of FIG. 2) can be performed as follows using the following exemplary aggregation results.

Suppose for BusinessName.com, a large non-ESP company with many employees, the following results were determined:
1. There are less than 10 distinct company names associated with that domain.
2. More than 90% of email addresses with that domain are linked to the company name "BusinessName".
3. Some numbers of email addresses are linked to business names that are subsidiaries of BusinessName.
4. There are a number of companies not related to BusinessName with one email address each, sometimes two—these are errors in the original list being analyzed.

For "myesp.com," an email domain used by a large ESP company with many employees for its employees' email addresses, the following results were determined:
1. There are less than 10 distinct company names associated with that domain.
2. More than 90% of email addresses with that domain are linked to the company name "MyESP".
3. Some numbers of email addresses are linked to business names related to MyESP—subsidiaries, DBAs, etc.
4. There are a number of companies not related to MyESP with one email address each, sometimes two—these are errors in the original list being analyzed.

For "myesp.net," an email domain owned by a large ESP company and intended for its customers (e.g, Yahoo.com, gmail.com, etc), the following results were determined:
1. There are hundreds to hundreds of thousands of distinct company names associated with that domain.
2. An organization with the maximum number of email addresses linked to that domain has that number as <1% of all the email addresses of that domain.
3. The organization with the second highest number of email addresses has the same number or very close to the same number of e-mail addresses as the organization with the maximum number.
4. More than 90% of e-mail addresses with that domain are used by businesses linked to that domain only by 1-3 email addresses.

For "localschool.org," an e-mail domain used by a small-to-medium organization that may have a charter to sometimes create e-mail addresses with that domain for a small number of other small organizations, usually related to the original organization as being in the same locality, having the same non-profit status, serving the same clients, etc., the following results were determined:
1. There are less than 50 distinct organization names associated with that domain.
2. About 40-80% of email addresses with that domain are linked to the "LocalSchool."
3. Some numbers of e-mail addresses are in some combination linked to other various organizations, but none is close enough to the number of e-mail addresses for the "LocalSchool."

For "smalltown.org," an e-mail domain used by a medium-size organization that has a charter to create e-mail addresses with that domain for other small organizations, usually related to the original organization as being in the same locality, having the same non-profit status, serving the same clients, etc., the following results were determined:
1. There may be hundreds of distinct organization names associated with that domain.
2. The "SmallTown" organization is likely to be the one with the maximum number of e-mail addresses, but not definitely so.
3. An organization with the maximum number of e-mail addresses linked to that domain has that number as <40% of all the e-mail addresses of that domain, and the higher that percentage, the more likely that organization is the "SmallTown".

4. Some numbers of e-mail addresses are in some combination linked to other various organizations, but none is close enough to the number of e-mail addresses for the "SmallTown".

For "businessassociation.org," an email domain used by an association for the use of its members, and also for a small number of employees hired by the association, the following results were determined:

1. There may be hundreds of distinct organization names associated with that domain.
2. An organization with the maximum number of e-mail addresses linked to that domain has that number as <10% of all the e-mail addresses of that domain, and that organization likely isn't the "Business Association".
3. Some numbers of e-mail addresses are in some combination linked to other various organizations.

The above categories provide a suitable representation of the possible types of aggregation results that may be determined. To categorize the domains as "employee-use" or "public-use" consists of finding the company name with the maximum number of e-mail addresses for each domain, counting the total number of e-mail addresses for that domain, and choosing a threshold for that total number. The same threshold may be used for all the numbers of e-mail domains or different numbers may be used. If the proportion represented by the number of e-mail addresses divided by the total number of the addresses is greater than the threshold then that email domain is categorized as an "employee-use" domain and that company can be considered the owner of that domain. Otherwise that domain is categorized as a "public-use" domain. For the example above, the threshold may be set to 80%. That would make the "businessname.com" and "myesp.com" domains employee-use with the corresponding names, and the others "public-use" domains. By sliding the threshold, it would be possible to categorize the "localschool.org" domain as an employee-use domain. The threshold can be set by selecting a sample of aggregated e-mail domains and manually verifying that the selected company name is correct for that threshold.

Thus in the above example, "businessname.com" is clearly an employee-use domain, because only employees of BusinessName are using e-mails with that domain for business, and nobody outside of BusinessName is allowed to do so. The "myesp.com" domain is also an employee-use domain because it is used by myESP employees, despite the fact that MyESP is an ESP. The "myesp.net" domain, on the other hand, is categorized as a public-use domain because it is used by the individuals who don't work for MyESP. The "localschool.org" falls into the employee-use domain category if it is assumed that the number of e-mail addresses not related to the school is much lower than the ones related to the school, so the analysis may decide to ignore the un-related users. The "smalltown.org" domain is in the public-use category, because the number of e-mail addresses used by employees of SmallTown is not much larger than the number of e-mail addresses allotted to other small organizations using that domain for their business e-mails. The "businessassociation.org" domain is categorized as a public-use domain because the vast majority of e-mail addresses are assigned to users who are not employees of the BusinessAssociation. An employee-use domain record can now be created (step 56) that indicates that the "businessname.com," "myESP.com," and "localschool.org" domains are employee-use domains, and associates the specific name of the business with each domain, e.g., the name of the business (BusinessName) with "businessname.com," the name of the ESP name with "myESP.com," and the name of the school with "localschool.org." Other information could also be stored in this record for each domain name, including, for example, one or more physical addresses associated with the name of the business, credit ratings of the business, etc. This record can be stored by the processing device 12 in the memory 16, or alternatively can be stored to a portable memory device or on a server accessible via a network for use by other computing devices.

Figure 3:
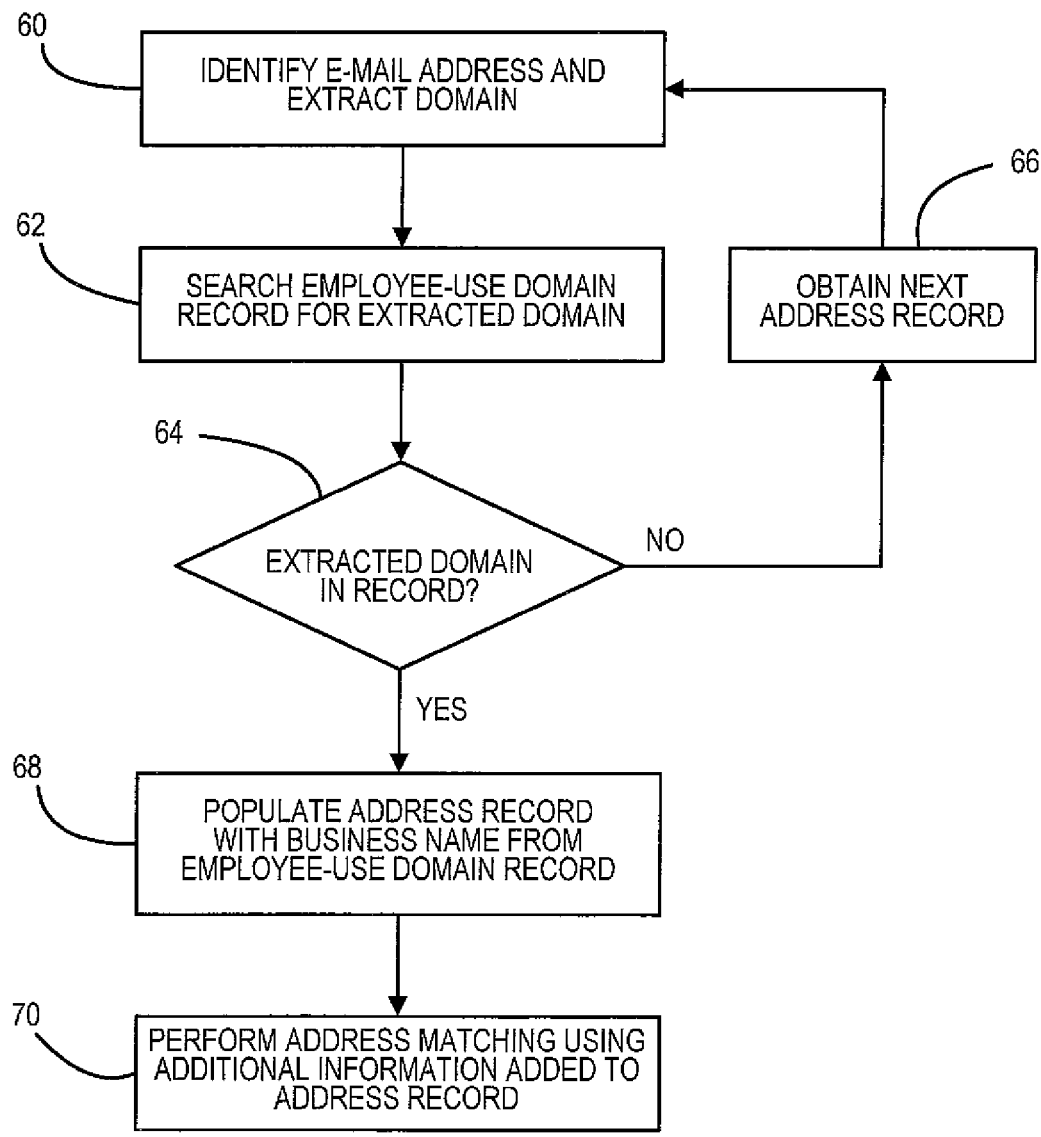
FIG. 3 illustrates in flow diagram form an example of address matching using e-mail domains according to an embodiment of the present invention.

Referring now to FIG. 3, there is illustrated in flow diagram form an example of address matching using the e-mail domains/company name record described above according to an embodiment of the present invention. The processing as illustrated in FIG. 3 can be performed by the computer system 10 as illustrated in FIG. 1. In general, during the process of updating and/or matching and/or cleansing name/address lists, the e-mail domains of input records are checked against the collection of the employee-use domains obtained as described above. If an exact match is found, the e-mail domain name and the e-mail domain owner's business name are inserted into the input record to be used as an alternate business name for that record, and thus will improve the chances of the right match to another record from the list, while not increasing the chances of a false-positive match. In step 60, a first address record is obtained and input to the computer system 10. The address record can include only an e-mail address, or an e-mail address along with other information, e.g., name, physical address, etc. The processing device 12 will examine the record to identify the e-mail address included in the record (using standard identification techniques to identify specific information) and then extract the domain name of the e-mail address (again, using standard identification techniques to identify specific information). In step 62, the processing device will search the employee-use domain record (obtained as described in FIG. 2 above) for the extracted domain name. The employee-use domain record can be obtained from a local memory device in computer system 10, from a portable memory device accessed by the processing device 12, or from a remote storage device (e.g., a server) that is accessed via network interface 18 and a network. In step 64 it is determined if the extracted domain name is included in the employee-use domain record. If it is not, then no changes are made to the existing address record and in step 66 the next address record is obtained for processing. If the extracted domain name is included in the employee-use domain record, then in step 68 the existing address record is updated to populate it with the business name associated with the domain name from the employee-use domain record to create an updated address record. In addition, other information contained in the employee-use domain record could also be included in the address record, such as a physical address for the business. In step 70, the updated address record can now be used to perform address matching, making use of the additional information added in step 68 to improve the quality of the matching process by improving the chances of match to another record from the list, while not increasing the chances of a false-positive match. Printing device 22 can be used for printing the results of the address matching process, or such results could be stored in the memory 16 of the computer system 10.

As an example that illustrates the processing performed in FIG. 3, consider the following examples. The following examples assume that the processing as illustrated in FIG. 2 has been performed, and the domain of "pb.com" is included in the employee-use domain record with the owner being Pitney Bowes, along with the domain names used by any subsidiaries of Pitney Bowes. The first example shows how use of the present invention can improve business name/address match rates when a company name is missing on a first record and an e-mail address is present on a second record, and why it's necessary to have a list of e-mail domains linked to a domain owner company name. Table 1 illustrates the first and second record for the first example.

TABLE 1

| Record 1: | Record 2: |
|---|---|
| Vadim Stelman | Alla Tsipenyuk |
| Pitney Bowes | 27 Waterview Dr, |
| 27 Waterview Dr | Shelton, CT 06484 |
| Shelton, CT 06484 | Alla.Tsipenyuk@pb.com |

Even though the physical address is the same (27 Waterview Dr., Shelton, Conn.), the existing matching engines will not return a match, because the business names do not match (there is no business name in Record 2). Using the present invention, the e-mail address from Record 2 would be identified (step 60), the domain would be extracted (step 62), and when found in the employee-use domain record, the name of the domain owner, Pitney Bowes, would be inserted into Record 2. The company name from Record 1 and Record 2 would therefore now match, thereby returning a valid match as the same business.

A second example shows how the method can improve address business name/address match accuracy when a company name is missing and an e-mail address is present on both records. Table 2 illustrates the first and second record for the second example.

TABLE 2

| Record 1: | Record 2: |
|---|---|
| Vadim Stelman | Alla Tsipenyuk |
| 27 Waterview Dr | 27 Waterview Dr, |
| Shelton, CT 06484 | Shelton, CT 06484 |
| Vadim.Stelman@pb.com | Alla.Tsipenyuk@pb.com |

Even though the physical address is the same, the existing matching engines will not return a match, because the business names are missing from both records. Using the present invention, the e-mail addresses from Record 1 and Record 2 would be identified (step 60), the domain would be extracted (step 62), and when found in the employee-use domain record, the name of the domain owner, Pitney Bowes, would have been inserted into Record 1 and Record 2. Therefore, having a match between both the company name and physical address, an address matching process will return a valid match as the same business for Record 1 and Record 2.

A third example shows a variation on the first and second examples. In this example, the e-mail address domain in Record 1 is not "pb.com", but instead is a different domain that still belongs to the business owner of "pb.com" domain, i.e., Pitney Bowes. Table 3 illustrates the first and second record for the third example.

TABLE 3

| Record 1: | Record 2: |
|---|---|
| Vadim Stelman | Alla Tsipenyuk |
| 27 Waterview Dr | 27 Waterview Dr, |

TABLE 3-continued

| Record 1: | Record 2: |
|---|---|
| Shelton, CT 06484 | Shelton, CT 06484 |
| Vadim.Stelman@mapinfo.com | Alla.Tsipenyuk@pb.com |

Even though the physical address is the same in both records, the existing matching engines will not return a match, because the names are too different. Using the present invention, each of the records' e-mail addresses would be identified (step 60), the domains would be extracted (step 62), and when found in the employee-use domain record, the name of the domain's owner, Pitney Bowes, would have been inserted into Record 1 and Record 2. Thus, since each record will now include the same physical address and business name, an address matching process will return a valid match as the same business for Record 1 and Record 2.

A fourth example illustrates why it is necessary to exclude the public-use domains to prevent false positive matches. Table 4 illustrates the first and second record for the fourth example.

TABLE 4

| Record 1: | Record 2: |
|---|---|
| Vadim Stelman | Alla Tsipenyuk |
| 27 Waterview Dr | 27 Waterview Dr, |
| Shelton, CT 06484 | Shelton, CT 06484 |
| Vadim.Stelman@gmail.com | Alla.Tsipenyuk@gmail.com |

Note that the only difference between the record in Table 2 and Table 4 is in the e-mail domain names in the e-mail addresses. Even though the physical addresses are the same in each record in Table 4, the existing matching engines will not return a match, because the business names are missing from both records. Using the present invention, each of the records' e-mail addresses would be identified (step 60), the domains would be extracted (step 62), but would not be found in the employee-use domain record (step 64), as the gmail.com domain would have been identified as a public-use domain during the processing illustrated in FIG. 2. Thus, the records in Table 4 would not be updated (step 68 would not be performed), and the address matching process will not change and correctly return a "no match" result, too. If just the e-mail domain name was used for matching without first checking whether it's in the employee-use domain record, a match would be returned that would be incorrect, because "gmail.com" can be easily used by different companies or individuals for personal e-mail addresses.

The method of the present invention can either be built into a name/address matching engine in a way that the e-mail address could be tagged appropriately and the engine would perform the look-ups in the background without the user necessarily knowing about the existence of the employee-use domain record. Alternatively, it could be made available to the user for creation of additional fields before the records go to the traditional matching engine, or even without going to the traditional matching engine at all.

While preferred embodiments of the invention have been described and illustrated above, it should be understood that they are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for updating an electronic address record from an address list used in a computerized address matching application, the method comprising;

receiving, by a processing device, the address record, the address record including an e-mail address;

extracting, by the processing device, a domain name for the e-mail address;

searching, by the processing device, an employee-use domain record to determine if the extracted domain name is included in the employee-use domain record, the employee-use domain record containing a plurality of employee-use domain names, each employee-use domain name included in the employee-use domain record having information associated therewith;

if it is determined, by the processing device, that the extracted domain name is not included in the employee-use domain record, then not making any changes to the address record; and if it is determined, by the processing device, that the extracted domain name is included in the employee-use domain record, then updating, by the processing device, the address record to include the information associated with the extracted domain name from the employee-use domain record to create an updated address record.

2. The method of claim 1, further comprising:

performing, by the processing device, an address matching process using the updated address record.

3. The method of claim 1, wherein the information associated with each employee-use domain name includes a business name.

4. The method of claim 3, wherein the information associated with each employee-use domain name further includes a physical address associated with the business name.

5. A non-transitory computer readable medium comprising instructions, which when executed on a processing device, cause the processing device to update an electronic address record from an address list used in a computerized address matching application, the electronic address record including an e-mail address, by extracting a domain name for the e-mail address; searching an employee-use domain record to determine if the extracted domain name is included in the employee-use domain record, the employee-use domain record containing a plurality of employee-use domain names, each employee-use domain name included in the employee-use domain record having information associated therewith; if it is determined that the extracted domain name is not included in the employee-use domain record, then not making any changes to the address record; and if it is determined that the extracted domain name is included in the employee-use domain record, then updating the address record to include the information associated with the extracted domain name from the employee-use domain record to create an updated address record.

6. The non-transitory computer readable medium of claim 5, wherein the information associated with each employee-use domain name includes a business name.

7. The non-transitory computer readable medium of claim 6, wherein the information associated with each employee-use domain name further includes a physical address associated with the business name.

* * * * *